(12) United States Patent
Takeda et al.

(10) Patent No.: US 9,961,720 B2
(45) Date of Patent: May 1, 2018

(54) USER EQUIPMENT, MOBILE COMMUNICATION SYSTEM AND METHOD

(71) Applicant: NTT DOCOMO, INC., Chiyoda-ku (JP)

(72) Inventors: Shinya Takeda, Chiyoda-ku (JP); Takehiro Ida, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 41 days.

(21) Appl. No.: 15/029,468

(22) PCT Filed: Sep. 5, 2014

(86) PCT No.: PCT/JP2014/073510
§ 371 (c)(1),
(2) Date: Apr. 14, 2016

(87) PCT Pub. No.: WO2015/060024
PCT Pub. Date: Apr. 30, 2015

(65) Prior Publication Data
US 2016/0242234 A1 Aug. 18, 2016

(30) Foreign Application Priority Data
Oct. 22, 2013 (JP) .................................. 2013-219465

(51) Int. Cl.
*H04W 4/00* (2018.01)
*H04W 88/06* (2009.01)
(Continued)

(52) U.S. Cl.
CPC ......... *H04W 88/06* (2013.01); *H04L 65/1006* (2013.01); *H04L 65/1016* (2013.01);
(Continued)

(58) Field of Classification Search
CPC . H04L 65/00; H04L 65/1006; H04L 65/1016; H04M 1/2535; H04M 1/72563; H04M 3/00; H04M 3/42382; H04M 7/006
See application file for complete search history.

(56) References Cited

U.S. PATENT DOCUMENTS

2008/0132161 A1 6/2008 Chen et al.
2010/0329243 A1 12/2010 Buckley et al.

FOREIGN PATENT DOCUMENTS

CN 102484849 A 5/2012
JP 2005-295532 A 10/2005
(Continued)

OTHER PUBLICATIONS

Extended European Search Report dated Oct. 10, 2016 in Patent Application No. 14855568.3.
(Continued)

*Primary Examiner* — Kan Yuen
(74) *Attorney, Agent, or Firm* — Oblon, McClelland, Maier & Neustadt, L.L.P.

(57) ABSTRACT

One aspect of the present invention relates to user equipment supporting an IMS function, comprising: an application layer configured to provide a user interface for a user to set ON or OFF the IMS function; a SIP layer configured to enable or disable transmission of a SIP signal to a resident network corresponding to user's setting ON or OFF the IMS function in the user interface; and a modem layer configured to change an IMS related Capability of the user equipment related to the IMS function corresponding to user's setting ON or OFF the IMS function in the user interface and communicate with the resident network based on the changed Capability.

7 Claims, 8 Drawing Sheets

(51) Int. Cl.
| | |
|---|---|
| *H04M 3/00* | (2006.01) |
| *H04W 8/24* | (2009.01) |
| *H04M 1/725* | (2006.01) |
| *H04L 29/06* | (2006.01) |
| *H04M 3/42* | (2006.01) |
| *H04M 7/00* | (2006.01) |
| *H04M 1/253* | (2006.01) |

(52) U.S. Cl.
CPC ......... *H04M 1/72563* (2013.01); *H04M 3/00* (2013.01); *H04W 8/24* (2013.01); *H04L 65/00* (2013.01); *H04M 1/2535* (2013.01); *H04M 3/42382* (2013.01); *H04M 7/006* (2013.01)

(56) References Cited

FOREIGN PATENT DOCUMENTS

| JP | 2010-57113 A | 3/2010 |
|---|---|---|
| JP | 2010-511352 A | 4/2010 |
| JP | 2010-251864 A | 11/2010 |
| JP | 2012-199661 A | 10/2012 |
| JP | 2013-135455 A | 7/2013 |
| JP | 2013-157997 A | 8/2013 |
| JP | 2013-183296 A | 9/2013 |

OTHER PUBLICATIONS

International Search Report dated Nov. 18, 2014 in PCT/JP2014/073510.
Office Action dated Feb. 3, 2015 in Japanese Patent Application No. 2013-219465 (with English language translation).
GSM Association Official Document IR.92-IMS Profile for Voice and SMS, Version 9.0, 2015, pp. 1-40.
"3rd Generation Partnership Project; Technical Specification Group Services and System Aspects; IP Multimedia Subsystem (IMS); Stage 2 (Release 12)", 3GPP TS 23.228, V12.2.0, 2013, pp. 1-296.
"3rd Generation Partnership Project; Technical Specification Group Core Network and Terminals; IP multimedia call control protocol based on Session Initiation Protocol (SIP) and Session Description Protocol (SDP); Stage 3 (Release 12)", 3 GPP TS 24.229, V12.2.0, 2013, pp. 1-805.
"3rd Generation Partnership Project; Technical Specification Group Services and System Aspects; Architectural requirements (Release 13)", 3GPP TS 23.221, V13.0.0, 2014, pp. 1-52.
"3rd Generation Partnership Project; Technical Specification Group Core Network and Terminals; Non-Access-Stratum (NAS) protocol for Evolved Packet System (EPS); Stage 3 (Release 12)", 3GPP TS 24.301, V12.5.0, 2014, pp. 1-367.
Chinese Office Action dated Jan. 4, 2018 in Chinese Application No. 201480056771.0 (with English translation), 14 pages.

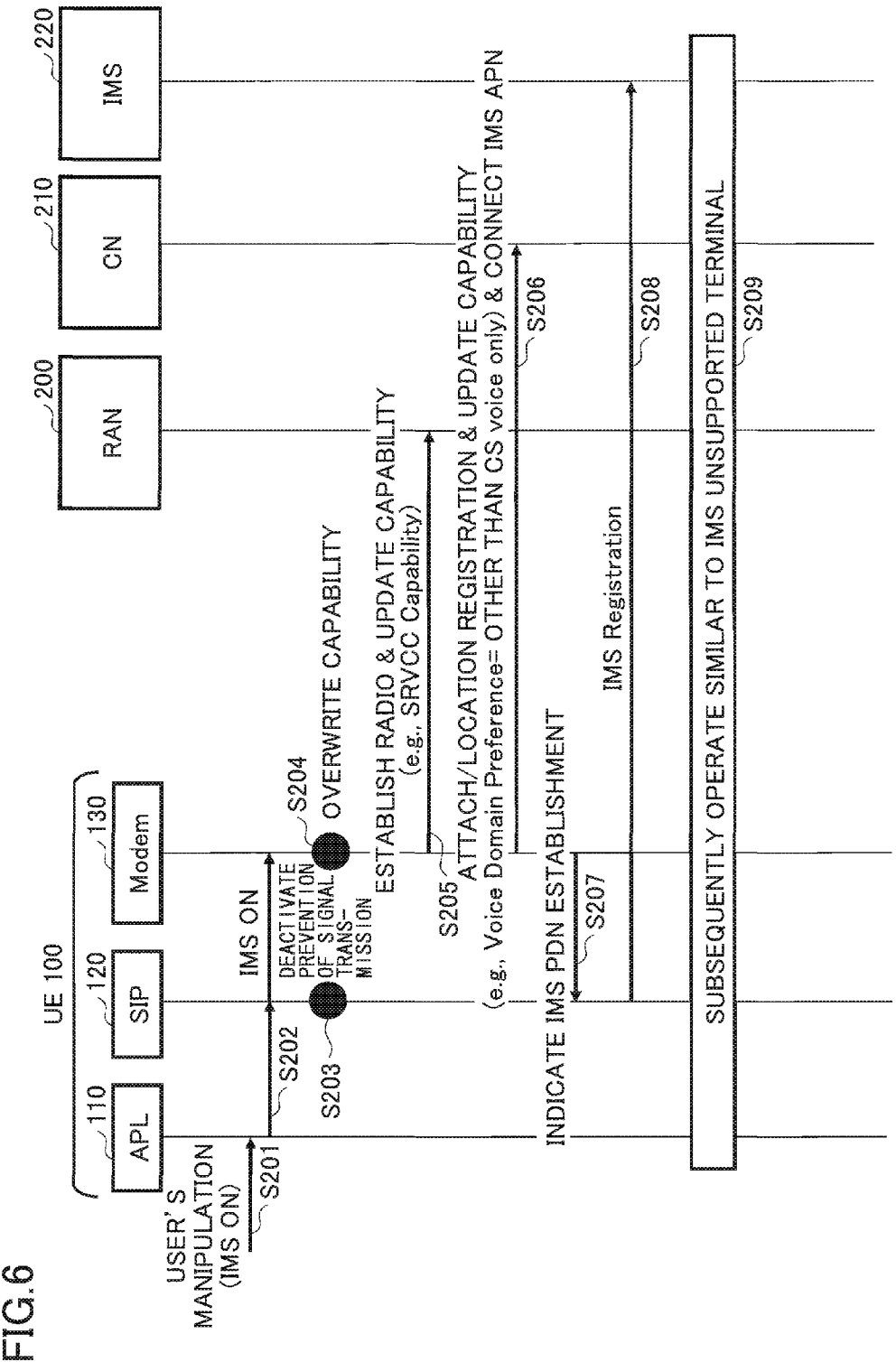

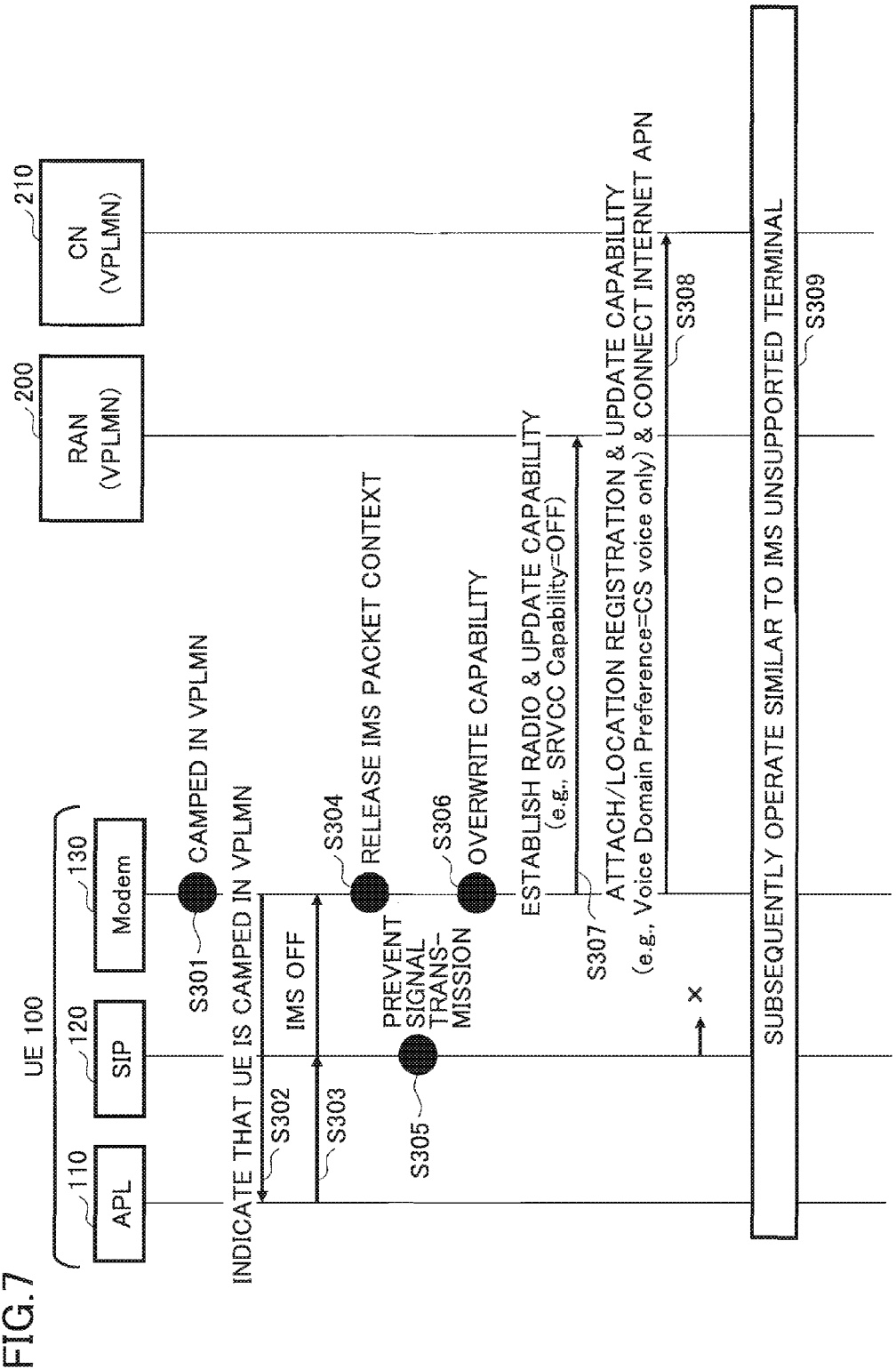

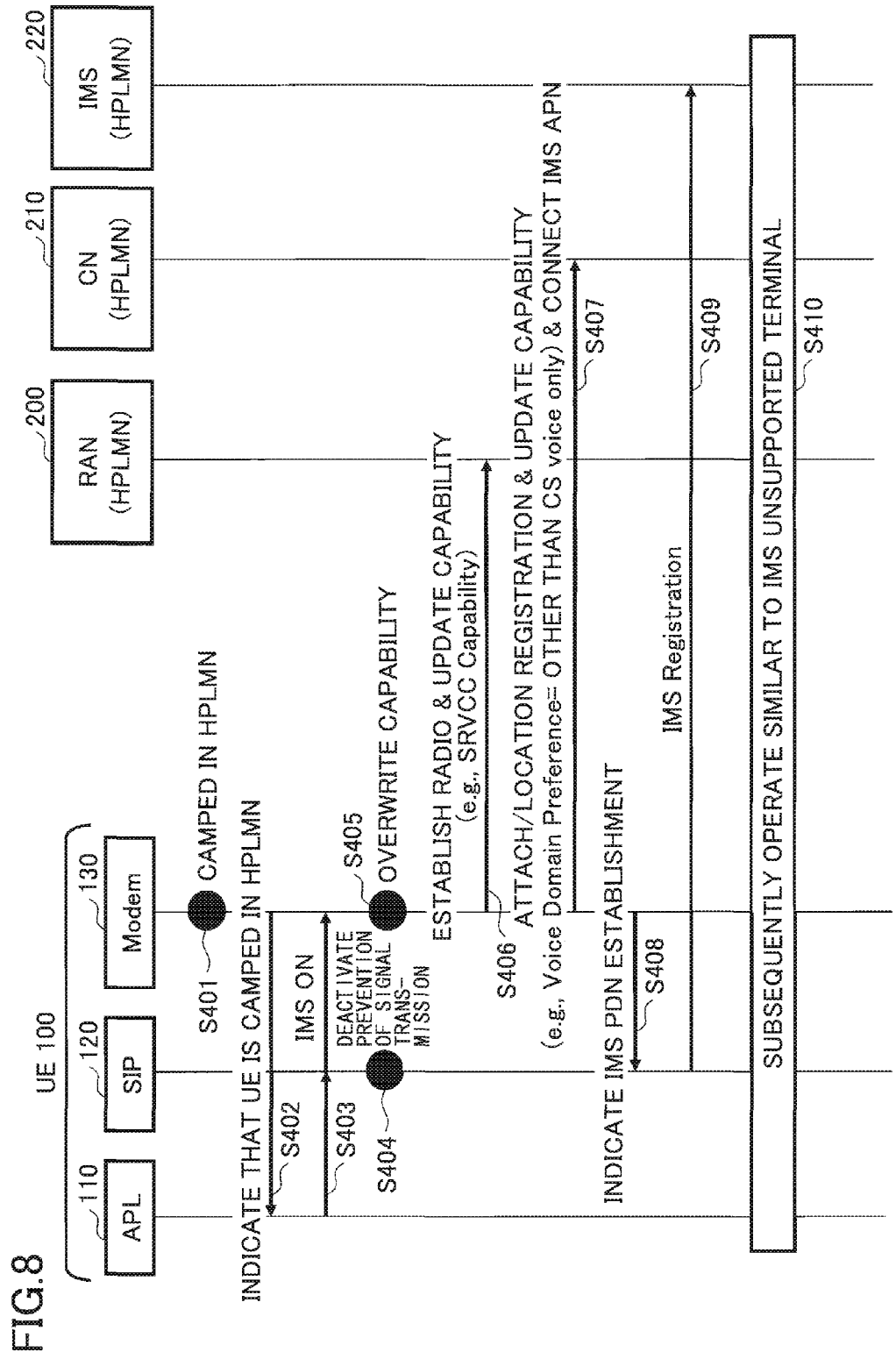

USER EQUIPMENT, MOBILE COMMUNICATION SYSTEM AND METHOD

TECHNICAL FIELD

The present invention relates to user equipment in a mobile communication system.

BACKGROUND ART

In $3^{rd}$ Generation Partnership Project (3GPP), an IP multimedia subsystem, specifically an IP Multimedia core network Subsystem (IMS), is defined in TS 23.228, TS 24.229 and the like for implementing multimedia services such as voice and SMS (Short Messaging Service) by using Session Initiation Protocol (SIP) at a mobile station or user equipment (UE). Also, in IR.92-IMS Profile for Voice and SMS in Global System for Mobile Communications Association (GSMA), requirements implement these services in LTE (Long Term Evolution) are specified, and in this document, voice and SMS services using the IMS implemented in the LTE are defined as VoLTE (Voice over LTE).

In the IMS, a packet switching (PS) domain can be used to provide services such as voice and SMS, which have been conventionally provided by using circuit switching (CS) domain. Since the services can be integrated into the PS domain facilities, it can be expected to reduce investment in the facilities. Also, the IMS can use broadband communication by QoS (Quality of Service) control to provide some merits to users, for example, provision of voice and video services of higher quality, provision of new services that cannot be achieved in the conventional CS domain such as presence, and the like.

RELATED ART DOCUMENT

Patent Document

Patent Document 1: JP 2013-135455
Patent Document 2: JP 2010-251864
Patent Document 3: JP 2010-057113

Non-Patent Document

Non-Patent Document 1: 3GPP TS 23.228
Non-Patent Document 2: 3GPP TS 24.229
Non-Patent Document 3: GSM Association Official Document IR.92-IMS Profile for Voice and SMS

SUMMARY OF INVENTION

Problem to be Solved by the Invention

However, when IMS served areas are not sufficient in a mobile communication system, when user equipment is camped in a network having no roaming agreement, or the like, there are some cases where it is not beneficial to use the IMS.

For example, a case where IMS supportability is different for the same operator depending on RATs is considered. As illustrated in FIG. 1, it is assumed that the IMS is provided in LTE while the IMS is not provided in UMTS (Universal Mobile Telecommunications System) and a terminal is camped in a network where LTE served areas are not sufficient yet. In this case, even if the terminal camped in the LTE starts an IMS voice call, there is a likelihood that when the terminal may transition to the IMS unsupported UMTS, the IMS voice call may be disconnected. For this problem, in 3GPP TS 24.237, TS 23.216 and the like, Single Radio Voice Call Continuity (SRVCC) scheme is defined. By using this scheme, even when the terminal transitions to an IMS non-served area during the IMS voice call, the terminal can continue the voice service by switching the voice service from the PS domain to the CS domain.

However, the SRVCC has not been required as mandatory in 3GPP, and accordingly if the operator does not support the SRVCC, the call would be disconnected at the RAT switching timing. Also, the SRVCC is a scheme involved in inter-RAT handover from the LTE to the UMTS or the like, and complicated operations where a state in the PS domain is taken over to the CS domain are conducted. Accordingly, implementation of the SRVCC may increase the disconnection risk. In this case, if a user wants to enjoy the voice service more reliably, it would be desirable that the voice service be initially served in the CS domain instead of the IMS.

Also, as illustrated in FIG. 2, in the case where an IMS supported terminal has roamed in an IMS unsupported network (VPLMN (Visited Public Land Mobile Network)), the network is not originally designed under the presumption that the IMS is supported, and it is not clear as to how to respond to the terminal that has requested to use the IMS. In this case, since it is obvious that the IMS service is not available, in response to an establishment request (PDN Connectivity Request (3GPP TS 24.301) in the LTE and Activate PDP Context Request (3GPP TS 24.008) in the UNITS) for an IMS packet context (Packet Data Network (PDN) in the LTE and PDP (Packet Data Protocol) in the UMTS) from the terminal, some actions can be considered, for example, a rejection response (PDN Connectivity Reject (3GPP TS 24.301) in the LTE and Activate PDP Context Reject (3GPP TS 24.008) in the UMTS) is sent back to reject the establishment, PDN/PDP is established but Registration in a SIP layer is not accepted, or the like.

However, in the case where the Reject is sent in reply to the PDN/PDP establishment request, according to terminal stipulation in GSMA IR.92 section 2.4.2.1, when the PDN for the IMS is disconnected, the terminal tries to re-establish the PDN for the IMS. At this time, since the IMS is not supported, the Reject is sent again in reply to the attempted re-establishment, which may be iterated and impose unnecessary NW loads. Also, the PDN/PDP re-establishment request is iteratively transmitted, which may consume battery energy in the terminal unnecessarily. It can be also considered that the NW performs operations other than the above operations, but the network is not originally designed under the presumption of the IMS. As a result, there is a high likelihood that unexpected problems may arise, which may affect services in the CS domain and services in the PS domain except the IMS. Accordingly, it may be desired to suppress the maximum occasions for the terminal to use the IMS depending on IMS supportability of a target roaming network.

In light of the above problem, one object of the present invention is to provide some techniques for providing voice services reliably in consideration of IMS availability in a network.

Means for Solving the Problem

One aspect of the present invention relates to user equipment supporting an IMS function, comprising: an application layer configured to provide a user interface for a user to set ON or OFF the IMS function; a SIP layer configured to enable or disable transmission of a SIP signal to a resident network corresponding to user's setting ON or OFF the IMS function in the user interface; and a modem layer configured to change an IMS related Capability of the user equipment related to the IMS function corresponding to user's setting ON or OFF the IMS function in the user interface and communicate with the resident network based on the changed Capability.

Another aspect of the present invention user equipment supporting an IMS function, comprising: an application layer configured to determine whether a resident network of the user equipment is an IMS supported network that supports the IMS function or an IMS unsupported network that does not support the IMS function; a SIP layer configured to enable or disable transmission of a SIP signal to the resident network corresponding to the determination as to whether the resident network is the IMS supported network or the IMS unsupported network; and a modem layer configured to change an IMS related Capability of the user equipment related to the IMS function corresponding to the determination as to whether the resident network is the IMS supported network or the IMS unsupported network and communicate with the resident network based on the changed Capability.

Advantage of the Invention

According to the present invention, it is possible to provide user equipment providing voice services reliably in consideration of IMS availability in a network.

BRIEF DESCRIPTION OF DRAWINGS

FIG. 6 is a sequence diagram illustrating an IMS ON setup operation according to one embodiment of the present invention;

FIG. 7 is a sequence diagram illustrating an IMS OFF setup operation according to another embodiment of the present invention; and FIG. 8 is a sequence diagram illustrating an IMS ON setup operation according to another embodiment of the present invention.

EMBODIMENTS OF THE INVENTION

Figure 1:
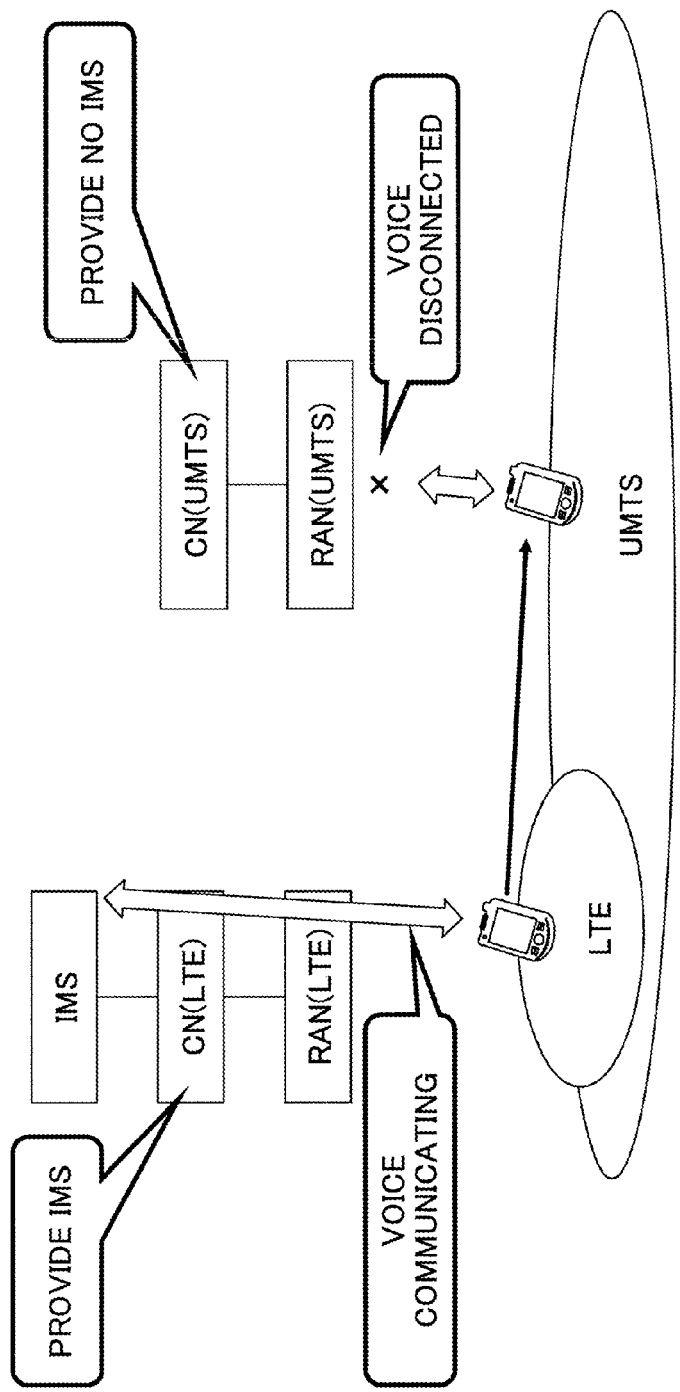
FIG. 1 is a diagram illustrating one example regarding a conventional IMS usage.
Figure 2:
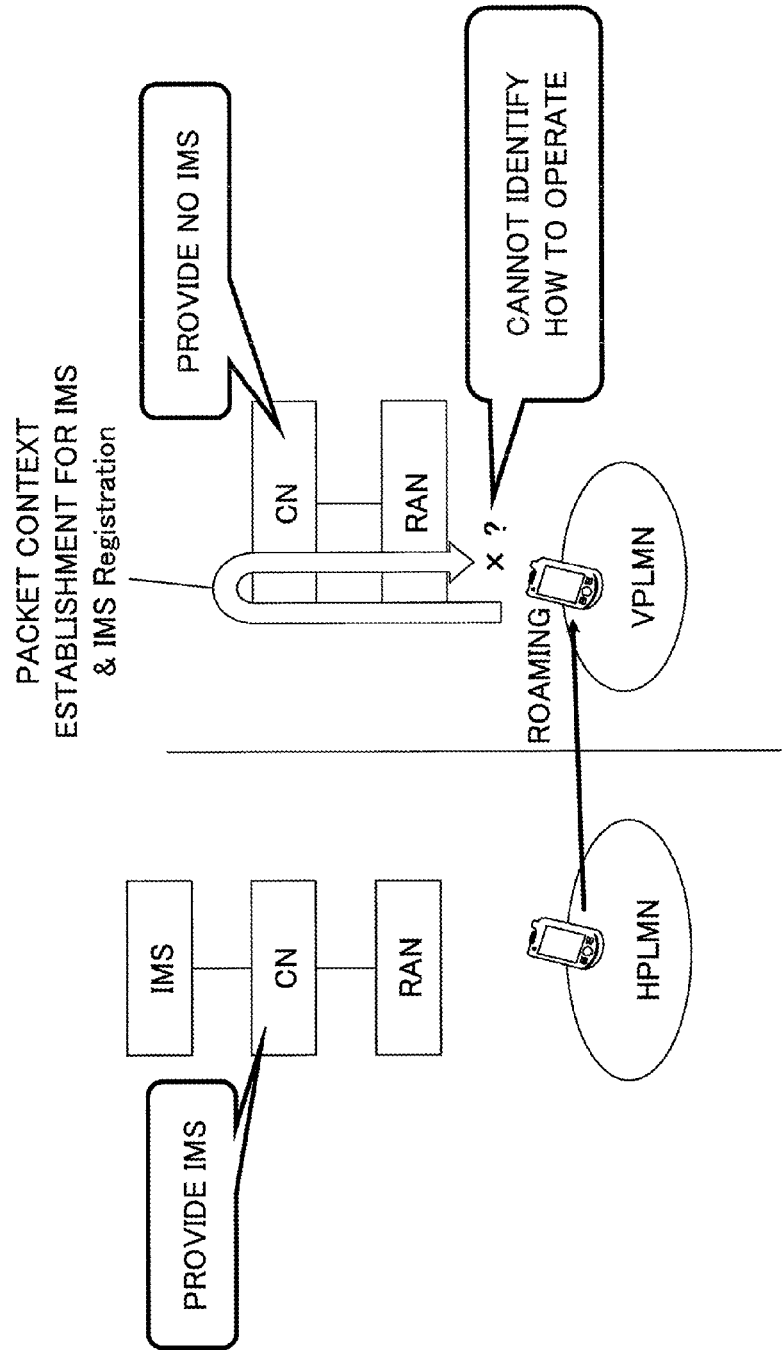
FIG. 2 is a diagram illustrating another example regarding a conventional IMS usage.

Embodiments of the present invention are described below with reference to the drawings.

Briefly overviewing embodiments of the present invention, user equipment for implementing IMS ON/OFF setup initiated by the user equipment in a communication network is provided.

In one embodiment, in response to a predefined event such as user's initiation of usage of voice services, user equipment provides a user interface for the user to set ON or OFF an IMS function. In response to user's manipulation on the provided user interface, the user equipment changes an IMS related Capability of the user equipment related to the IMS function corresponding to an IMS ON manipulation or an IMS OFF manipulation and communicates with a network as an IMS supported terminal or an IMS unsupported terminal.

For example, when the user performs the IMS OFF manipulation, the user equipment performs an IMS registration release operation to disable transmission of SIP signals to a resident network. Also, the user equipment changes a setup value for its IMS related Capability into the same setup value as the IMS related Capability configured for the IMS unsupported terminal so that the user equipment can operate similar to the IMS unsupported terminal that does not support the IMS function. For example, the IMS related Capability includes capabilities of Voice Domain Preference, SRVCC (Single Radio Voice Call Continuity) and the like. As a result, the network will handle the user equipment in the exactly same manner as the IMS unsupported terminal, and unexpected operations can be prevented such as procedures conducted for only the IMS supported terminal, for example, incoming call at the IMS side. On the other hand, when the user performs the IMS ON manipulation, the user equipment changes a transmission disabling setup of SIP signals to the resident network into a transmission enabling setup and performs the IMS registration operation. Also, the user equipment restores the setup value of its IMS related Capability to the setup value of the pre-changed IMS related Capability before changing by the IMS OFF setup. As a result, the user equipment can operate similar to having the previous IMS ON setup.

Also, in another embodiment, user equipment determines whether the user equipment is camped in an IMS supported network that supports the IMS function or an IMS unsupported network that does not support the IMS function, changes the IMS related Capability of the user equipment associated with the IMS function corresponding to the determination, and communicates with the network as the IMS supported terminal or the IMS unsupported terminal.

For example, when the user equipment is camped in the IMS unsupported network, the user equipment is configured to disable transmission of SIP signals to the resident network. Also, the user equipment changes a setup value of its IMS related Capability into the same setup value as the IMS related Capability configured for the IMS unsupported terminal so that the user equipment can operate similar to the IMS unsupported terminal. As a result, the network can handle the user equipment in the exactly same manner as the IMS unsupported terminal, and unexpected operations can be prevented such as procedures performed for only the IMS supported terminal, for example, incoming calls at the IMS side. On the other hand, when user equipment is camped in the IMS supported network, the user equipment changes the transmission disabling setup of SIP signals to the resident network into the transmission enabling setup and performs an IMS registration operation. Also, the user equipment restores the setup value of its IMS related Capability into the setup value of the IMS related Capability before changing by the IMS OFF setup. As a result, the user equipment can operate similar to the previous IMS ON setup.

In this manner, the user equipment can provide a user with voice services reliably by performing user equipment-initiated IMS ON/OFF setup in consideration of IMS availability in a communication network.

An arrangement of user equipment according to one embodiment of the present invention is described with reference to FIG. 3. For example, the user equipment is implemented as any information processing apparatus having radio communication functions such as a cellular phone, a smartphone, a tablet and a mobile router. The user equipment connects to a network through radio communication with a base station, a radio network controller (RNC) or the like and uses various communication services such as voice services and data services. In embodiments below, the user equipment is an IMS supported terminal that supports an IMS function and can not only communicate with a network supporting an IMS service (VoLTE) such as a LTE network but also communicate with a network of a RAT such as UMTS, Global System for Mobile Communications (GSM) and the like that do not support the IMS service.

Figure 3:
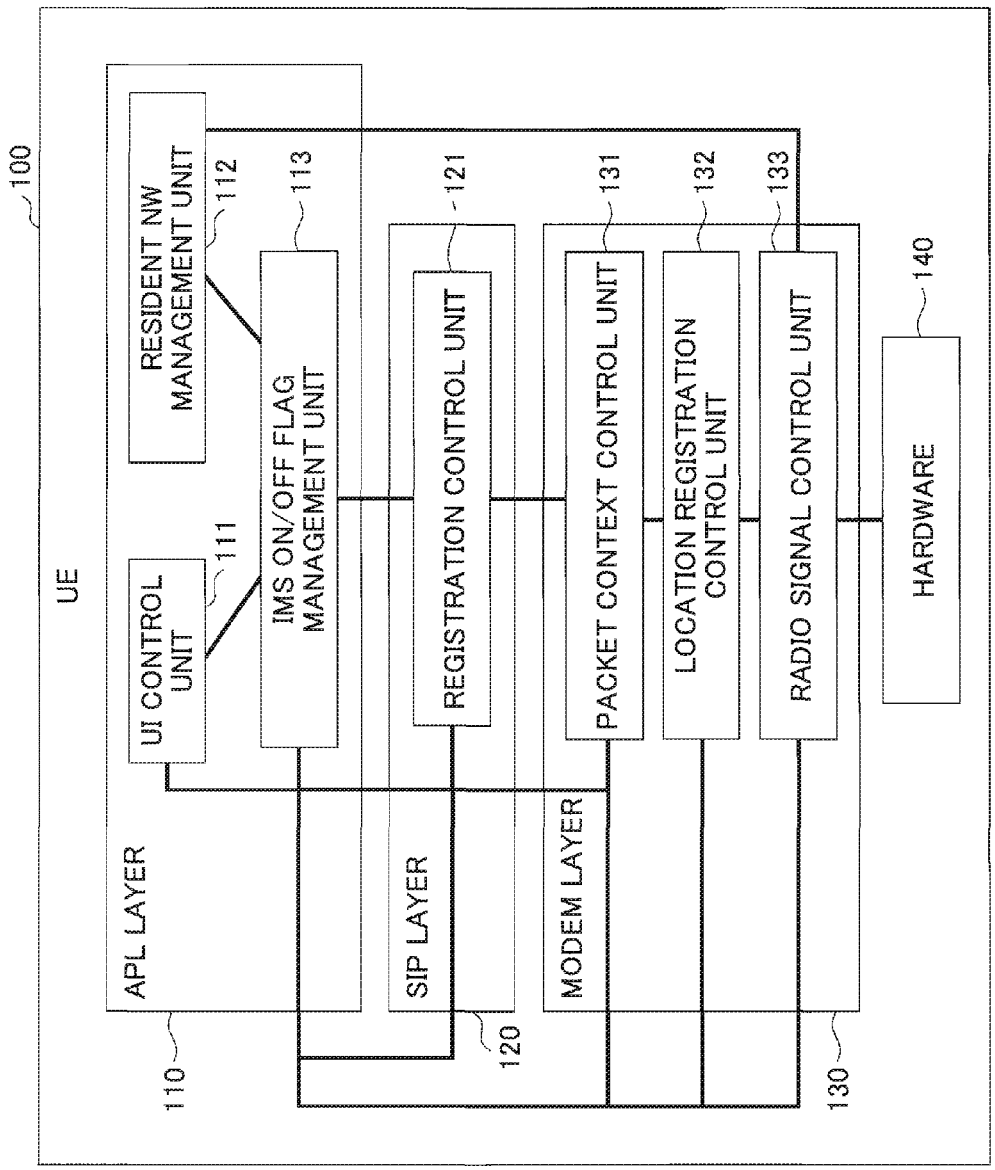
FIG. 3 is a block diagram illustrating an arrangement of user equipment according to one embodiment of the present invention.

FIG. 3 is a block diagram illustrating an arrangement of user equipment according to one embodiment of the present invention. As illustrated in FIG. 3, user equipment (UE) 100 has an application (APL) layer 110, a SIP layer 120, a modem layer 130 and hardware 140.

The APL layer 110 controls various applications running on the user equipment 100. In one embodiment, the APL layer 110 provides a user interface for a user to set ON or OFF an IMS function and indicates user's manipulation on the ON/OFF setup to the SIP layer 120 and the modem layer 130. Also, in another embodiment, the APL layer 110 determines whether a resident network of the user equipment 100 is an IMS supported network or an IMS unsupported network and indicates the determination to the SIP layer 120 and the modem layer 130.

As illustrated in FIG. 3, the APL layer 110 has a user interface (UI) control unit 111, a resident network (NW) management unit 112 and an IMS ON/OFF flag management unit 113.

The UI control unit 111 provides a user interface for a user to manipulate the IMS ON/OFF setup and indicates user's IMS ON/OFF setup manipulation to the IMS ON/OFF flag management unit 113, the SIP layer 120 and the modem layer 130. The UI control unit 111 may typically display a GUI (Graphical User Interface) for manipulation on a display in the user equipment 100 and implement the user interface for the IMS ON/OFF setup by causing the user to touch a predefined portion on the displayed GUI or push a button attached in the user equipment 100 in a predefined portion.

The NW management unit 112 determines whether the resident network of the user equipment 100 is the IMS supported network or the IMS unsupported network. For example, the NW management unit 112 can determine whether the resident network is the IMS supported network or the IMS unsupported network based on a PLMN (Public Land Mobile Network) identifier received from the modem layer 130. The NW management unit 112 indicates the determination to the IMS ON/OFF flag management unit 113, the SIP layer 120 and the modem layer 130.

The IMS ON/OFF flag management unit 113 has an IMS ON/OFF to manage the ON/OFF setup of the IMS function. The IMS ON/OFF flag management unit 113 updates the IMS ON/OFF flag depending on user's IMS ON/OFF setup manipulation received from the UI control unit 111. Also, the IMS ON/OFF flag management unit 113 updates the IMS ON/OFF flag depending on the determination received from the NW management unit 112 as to whether the resident network is the IMS supported network or the IMS unsupported network. Specifically, upon receiving the determination indicating that the resident network is the IMS supported network, the IMS ON/OFF lag management unit 113 sets the IMS ON/OFF flag to the IMS ON. On the other hand, upon receiving the determination indicating that the resident network is the IMS unsupported network, the IMS ON/OFF flag management unit 113 sets the IMS ON/OFF flag to the IMS OFF.

The SIP layer 120 controls SIP operations in communication operations. In one embodiment, upon receiving user's manipulation for the IMS ON/OFF setup from the APL layer 110, the SIP layer 120 enables or disables transmission of SIP signals to the resident network. Specifically, the SIP layer 120 disables the transmission of SIP signals to the resident network in response to the IMS OFF setup manipulation and enables the transmission of SIP signals to the resident network in response to the IMS ON setup manipulation. Also, upon receiving the determination that the resident network is the IMS unsupported network from the APL layer 110, the SIP layer 120 disables the transmission of SIP signals to the resident network, and upon receiving the determination that the resident network is the IMS supported network from the APL layer 110, the SIP layer 120 enables the transmission of SIP signals to the resident network.

More specifically, the SIP layer 120 has a registration control unit 121, and the registration control unit 121 performs the above-stated operations. When the determination that the IMS OFF setup manipulation has been performed or the determination that the resident network is the IMS unsupported network is indicated from the APL layer 110, the registration control unit 121 starts a SIP_Deregistration procedure to deactivate a SIP Registration state. After completion of the procedure, the registration control unit 121 prevents the whole SIP layer from transmitting SIP signals including the SIP_Registration to an opponent IMS NW. On the other hand, when the determination that the IMS ON setup manipulation has been performed or the determination that the resident network is the IMS supported network is indicated from the APL layer 110, the registration control unit 121 changes the transmission prevention setup of SIP signals into a transmission enabling setup and starts the IMS Registration procedure for the resident network IMS NW.

The modem layer 130 controls communication operations between the user equipment 100 and a network. In one embodiment, in response to user's ON or OFF setup of the IMS function, the modem layer 130 changes the IMS related Capability of the user equipment 100 related to the IMS function and communicates with the resident network based on the changed Capability. More specifically, in response to the user's IMS function OFF setup, the modem layer 130 changes the IMS related Capability of the user equipment 100 to correspond to the IMS related Capability configured for an IMS unsupported terminal. Also, in response to the user's IMS function ON setup, the modem layer 130 restores the IMS related Capability of the user equipment 100 that has been changed in response to the OFF setup into the pre-changed IMS related Capability.

In another embodiment, in response to the determination that the resident network is the IMS supported network or the IMS unsupported network, the modem layer 130 changes the IMS related Capability of the user equipment 100 and communicates with the resident network based on the changed Capability. More specifically, in response to the determination that the resident network is the IMS unsupported network, the modem layer 130 changes the IMS related Capability of the user equipment 100 to correspond to the IMS related Capability configured for an IMS unsupported terminal. On the other hand, in response to the determination that the resident network is the IMS supported network, the modem layer 130 restores the IMS related Capability of the user equipment 100 that has been changed in response to the OFF setup into the pre-changed IMS related Capability.

As illustrated in FIG. 3, the modem layer 130 has a packet context control unit 131, a location registration control unit 132 and a radio signal control unit 133.

Upon receiving an indication that the IMS OFF has been set from the APL layer 110, the packet context control unit 131 first performs a release procedure of a packet context (PDN/PDP) for the IMS. Next, the packet context control unit 131 establishes the packet context (PDN/PDP) in accordance with operations similar to the IMS unsupported terminal. Specifically, the packet context control unit 131 sets an APN (Access Point Name) indicated at establishment of the packet context (PDN/PDP) to an Internet APN or the like other than the IMS APN to transmit a packet context (PDN/PDP) establishment request of the Internet APN to a core network (CN). In general, there are many terminals where the Internet APN can be set by users in a UI in advance, and accordingly APN information is obtained from the APL layer 110 as needed.

Upon receiving an indication that the IMS OFF has been set from the APL layer 110, the location registration control unit 132 changes all IMS related Capabilities to the same setup values as the IMS unsupported terminal. Many IMS related Capabilities are assumed, but Voice Domain Preference as specified in 3GPP TS 24.301, TS 23.221 and the like is included as one example. For the Voice Domain Preference, four setup values are prepared, "IMS PS Voice preferred, CS Voice as secondary" indicating that the user equipment 100 can use voice services in both the IMS domain and the CS domain and usage of the voice services in the IMS domain is prioritized, "CS Voice preferred, IMS PS Voice as secondary" indicating that the user equipment 100 can use voice services in both the IMS domain and the CS domain and usage of the voice services in the CS domain is prioritized, "IMS PS Voice only" indicating that the user equipment 100 can use voice services only in the IMS domain, and "CS Voice only" indicating that the user equipment 100 can use voice services in only the CS domain. "CS Voice only" is set for the IMS unsupported terminal whereas any setup value of "IMS PS Voice preferred, CS Voice as secondary", "CS Voice preferred, IMS PS Voice as secondary" and "IMS PS Voice only" is set for the IMS supported terminal.

Meanwhile, according to the specification, it is not clearly defined in 3GPP and GSMA in what application a CN uses the Voice Domain Preference and what influence may arise upon changing, and they are entrusted to network operations. Accordingly, if the Voice Domain Preference is set to a setup value other than "CS Voice only", there is a likelihood that the network may recognize the user equipment 100 as the IMS supported terminal and handles the user equipment 100 in a different manner from the IMS unsupported terminal terms of some points. As an example, it is assumed that the CN tries an incoming call in the IMS domain and the incoming call is unsuccessful, although the terminal cannot use the IMS. If the user sets the IMS OFF, it can be expected that the user desires to use reliable voice services, and accordingly it can be considered to be reliable that the user equipment 100 is exactly the same as the IMS unsupported terminal. Under such an assumption, it is desirable that the Voice Domain Preference be set to "CS Voice only" for the user equipment 100 to which the IMS OFF has been set. Accordingly, upon receiving an indication that the IMS OFF has been set, the location registration control unit 132 changes the Voice Domain Preference into "CS Voice only" Similarly, the location registration control unit 132 changes the setup value to have the same Capability as the IMS unsupported terminal for the IMS related Capabilities other than the Voice Domain Preference.

When it is indicated that the IMS OFF has been set, the radio signal control unit 133 also sets all the IMS related Capabilities to be the same as the IMS unsupported terminal. Also, many IMS related Capabilities are assumed herein, and as one example, SRVCC Capability (EUTRA RRC_CONNECTED to UTRA CELL_DCH CS handover) defined in TS 25.331 is included. If the IMS OFF is indicated, the radio signal control unit 133 set the SRVCC Capability to be unsupported. This is because operations different from those for the IMS unsupported terminal can be prevented, similar to the above-stated Voice Domain Preference.

The hardware 140 is typically composed of CPU (Central Processing Unit) such as a processor, a memory device such as a RAM (Random Access Memory), a communication device for communicating radio signals, an interface device for interfacing various data and/or instructions to the user, and the like. For example, functions and operations of the user equipment 100 as stated below and the above-stated various layers are implemented by the CPU processing data in accordance with data and programs stored in the memory device.

Next, IMS setup operations in the user equipment according to one embodiment of the present invention are described with reference to FIGS. 4-6. In this embodiment, in response to user's IMS ON/OFF setup manipulation, the user equipment 100 performs the IMS setup operation.

Figure 4:
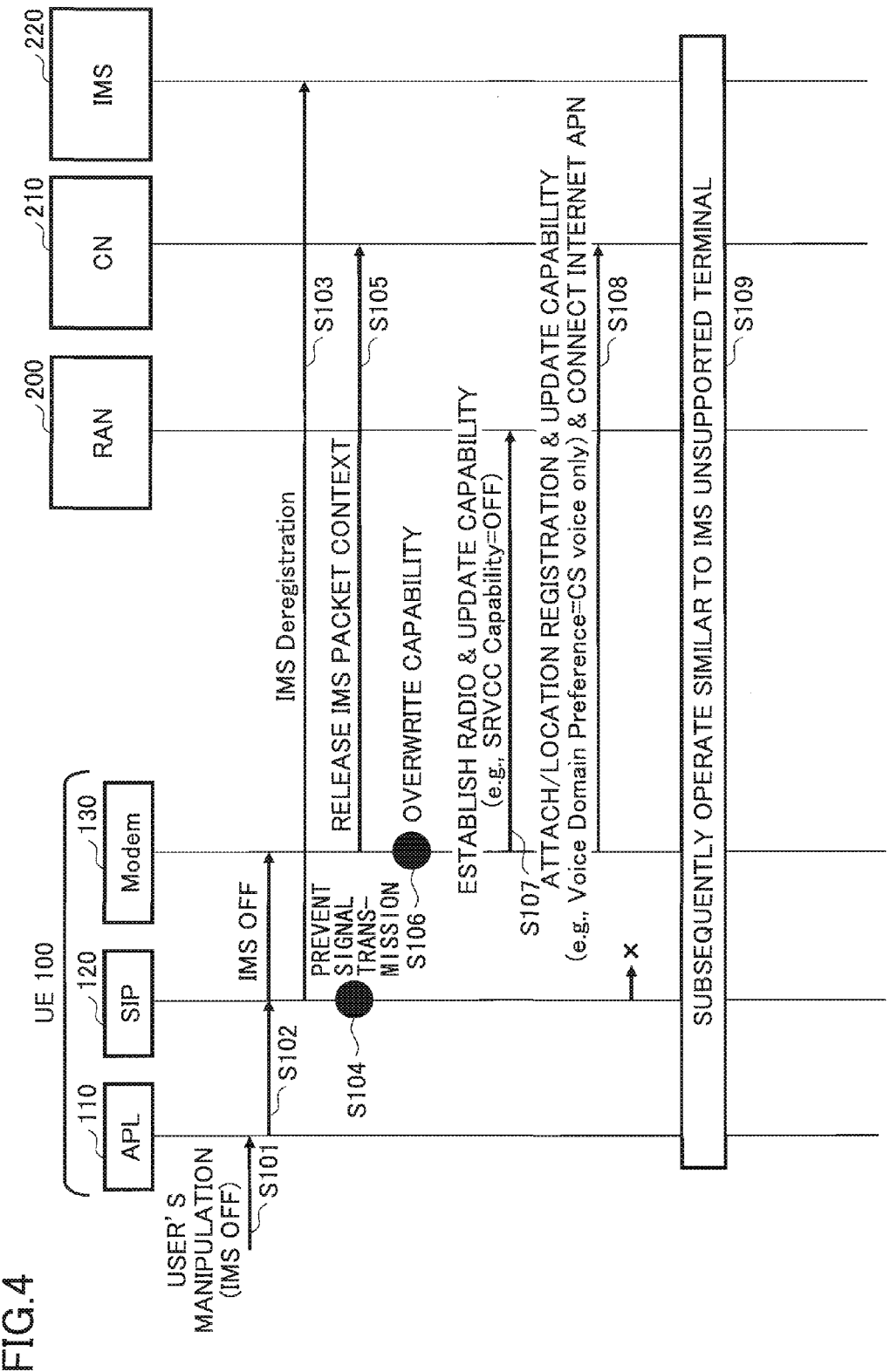
FIG. 4 is a sequence diagram illustrating an IMS OFF setup operation according to one embodiment of the present invention.
Figure 5:
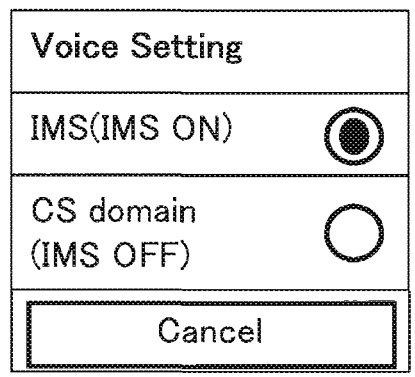
FIG. 5 is a diagram illustrating an exemplary screen display on user equipment according to one embodiment of the present invention.

FIG. 4 is a sequence diagram illustrating an IMS OFF setup operation according to one embodiment of the present invention. As illustrated in FIG. 4, at step S101, a user sets OFF the IMS function of the user equipment 100. Specifically, the user selects to use voice service in the CS domain. This setup manipulation may be performed via a user interface provided by the APL layer 110. As one example, a UI image as illustrated in FIG. 5 is displayed on a display in the user equipment 100, and the IMS ON/OFF may be set by the user pushing a desired button on the UI image. For example, the IMS setup screen may be automatically displayed at any appropriate timing such as a start timing of user's usage of the voice services or at any timing during the usage of voice services. Alternatively, the IMS setup screen may be displayed through user's manual manipulation.

Also, if information regarding a history of previous IMS usage is stored, the APL layer 110 may use the history information to display an IMS setup screen. For example, if the IMS ON/OFF setup previously used in the resident network and stored in the history information does not match the current IMS ON/OFF setup, the APL layer 110 may display the IMS setup screen on the display together with a message indicating that the IMS ON/OFF setup previously used in the resident network is different from the current IMS ON/OFF setup. In another example, in the case where the user equipment 100 has positioning means such as a GPS (Global Positioning System), upon determining that the detected current position of the user equipment 100 is at or near the position where the IMS setup was previously changed by the user, the APL layer 110 may display the IMS setup screen. Also, upon determining that the detected position of the user equipment 100 is at or near the position where the IMS services previously became unavailable due to disconnection or the like, the APL layer 110 may display the IMS setup screen. This is because the user is more likely to set OFF the IMS setup at the position where the IMS setup was previously changed or at the position where the IMS services became unavailable.

At step S102, the APL layer 110 indicates to the SIP layer 120 and the modem layer 130 that the IMS OFF has been set.

At step S103, the SIP layer 120 starts a SIP_Deregistration procedure to deactivate the SIP registration state. Specifically, the SIP layer 120 transmits an IMS Deregistration to an IMS NW 220 to deactivate the registration state of the user equipment 100 with the IMS NW 220. Upon receiving the IMS Deregistration, the IMS NW 220 deactivates the registration with the IMS services of the user equipment 100.

At step S104, upon completion of the SIP_Deregistration procedure, the SIP layer 12 prevents SIP signals including the SIP_Registration from being transmitted to the IMS NW 220.

At step S105, upon receiving an indication that the IMS OFF has been set, the packet context control unit 131 in the modem layer 130 performs a release procedure of the IMS packet context (PDN/PDP).

At step S106, the location registration control unit 132 in the modem layer 130 sets all the IMS related Capabilities including the Voice Domain Preference similar to the IMS unsupported terminal. In general, "CS Voice only" is set to the IMS unsupported terminal, and on the other hand, any setup value of "IMS PS Voice preferred, CS Voice as secondary", "CS Voice preferred, IMS PS Voice as secondary" and "IMS PS Voice only" is set. Accordingly, upon receiving an indication that the IMS OFF has been set, the location registration control unit 132 changes the Voice Domain Preference into "CS Voice only". In this manner, the location registration control unit 132 also changes the setup values for the IMS related Capabilities other than the Voice Domain Preference so that they can be the same as those for the IMS unsupported terminal. Also, the radio signal control unit 133 also sets all the IMS related Capabilities including the SRVCC Capability (EUTRA RRC_CONNECTED to UTRA CELL_DCH CS handover) to be the same as the IMS unsupported terminal.

At step S107, the radio signal control unit 133 in the modem layer 130 establishes radio communication with the RAN 200 based on Capabilities such as the updated SRVCC Capability. Specifically, if the IMS OFF has been indicated, the radio signal control unit 133 sets the SRVCC Capability and the like to be unsupported. This is the same as the above-stated Voice Domain Preference, which is to prevent occurrence of operations different from those for the IMS unsupported terminal.

At step S108, the location registration control unit 132 starts an Attach or a location registration based on the Capability that has been set in the above-stated manner. Also, the packet context control unit 131 sets the APN, which will be specified at packet context (PDN/PDP) establishment, to the Internet APN or the like other than the IMS APN and transmits an establishment request to the CN 210. The Capability that has been set by the location registration control unit 132 and the establishment request of the packet context from the packet context control unit 131 are indicated to the CN 210 via the RAN 200.

At step S109, the RAN 200 and the CN 210 receiving the indication will handle the user equipment 100 in the exactly same manner as the IMS unsupported terminal. As a result, it is possible to prevent unexpected operations such as execution of operations to be performed for the IMS supported terminal. On the other hand, the SIP layer 120 is prevented from transmitting SIP signals, and accordingly the IMS NW 220 cannot identify the user equipment 100 itself.

FIG. 6 is a sequence diagram illustrating an IMS ON setup operation according to one embodiment of the present invention. As illustrated in FIG. 6, at step S201, a user sets ON the IMS function for the user equipment 100. Specifically, the user selects to use voice services in the PS domain. This setup manipulation may be performed via a user interface provided by the APL layer 110, as stated in conjunction with FIG. 5. For example, the IMS setup screen may be automatically displayed at any appropriate timing such as a start timing of user's usage of voice services and any timing during usage of voice services. Alternatively, the user may manually display the IMS setup screen. Also, if information regarding a history of previous IMS usage is stored in the user equipment 100, the APL layer 110 may use the history information to display the IMS setup screen.

At step S202, the APL layer 110 indicates to the SIP layer 120 and the modem layer 130 that the IMS ON has been set.

At step S203, the SIP layer 120 deactivates transmission prevention of SIP signals to the IMS NW 220.

At step S204, the location registration control unit 132 restores the IMS related Capability including the Voice Domain Preference into the setup value before the IMS OFF setup operation. For example, the Voice Domain Preference is restored into any setup value of "IMS PS Voice preferred, CS Voice as secondary", "CS Voice preferred, IMS PS Voice as secondary" and "IMS PS Voice only". To this end, when the Capability is changed in the IMS OFF setup operation, the pre-changed Capability is stored in a memory device or the like. Also, the radio signal control unit 133 restores the IMS related Capability including the SRVCC Capability into the setup value before the IMS OFF setup operation.

At step S205, the radio signal control unit 133 establishes radio communication with the RAN 200 based on the Capability such as the updated SRVCC Capability.

At step S206, the location registration control unit 132 starts an Attach or a location registration based on the Capability configured in the above-stated manner. Also, the packet context control unit 131 sets an APN specified at the packet context (PDN/PDP) establishment as an IMS APN and transmits an establishment request to the CN 210. The Capability configured by the location registration control unit 132 and the packet context establishment request from the packet context control unit 131 are indicated to the CN 210 via the RAN 200.

At step S207, the modem layer 130 indicates an IMS PDN establishment indication to the SIP layer 120.

At step S208, the SIP layer 120 starts a SIP_Registration procedure to request a SIP Registration. Specifically, the SIP layer 120 transmits an IMS Registration to the IMS NW 220. Upon receiving the IMS Registration, the IMS NW 220 enables registration of the user equipment 100 with the IMS services.

At step S209, the RAN 200 and the ON 210 will handle the user equipment 100 as the IMS supported terminal similar to before having the IMS OFF setup.

Next, an IMS setup operation in the user equipment according to another embodiment of the present invention is described with reference to FIGS. 7-8. In this embodiment, the user equipment automatically performs an IMS setup operation depending on a resident network. Specifically, the situations where a HPLMN and a VPLMN exist, the VPLMN does not support the IMS, or no IMS roaming agreement is signed between the VPLMN and the HPLMN are considered. In these situations, since the VPLMN does not support the IMS, it cannot be ensured how the IMS supported terminal may operate under the case where it is camped in the VPLMN, and there is a likelihood that it cannot operate reliably. In order to achieve the operation more reliably, the IMS in the user equipment is set OFF so that it can operate in the same manner as the IMS unsupported terminal during camping in the VPLMN.

FIG. 7 is a sequence diagram illustrating an IMS OFF setup operation according to another embodiment of the present invention. As illustrated in FIG. 7, at step S301, the user equipment 100 is camped in the VPLMN.

At step S302, the modem layer 130 indicates to the APL layer 110 that the user equipment 100 has been camped in the VPLMN. Since this indication includes a PLMN identifier of the VPLMN, the APL layer 110 can recognize that the user equipment 100 has been camped in the VPLMN based on the PLMN identifier.

At step S303, the APL layer 110 sets OFF the IMS setup based on a Configuration having the IMS OFF during camping in the VPLMN in advance and indicates to the SIP layer 120 and the modem layer 130 that the IMS OFF has been set.

At step S304, the packet context control unit 131 in the modem layer 130 performs a release procedure of an IMS packet context (PDN/PDP). Here, since the IMS packet context (PDN/PDP) cannot be established in the VPLMN unlike the IMS OFF setup operation as illustrated in FIG. 4, the release operation of the IMS packet context (PDN/PDP) may be performed locally in the user equipment 100 in the case where the user equipment 100 determines that it is necessary.

At step S305, the SIP layer 120 prevents SIP signals including a SIP_Registration from being transmitted to the IMS NW 220. Since the VPLMN does not support the IMS, no IMS Deregistration is performed unlike the IMS OFF setup operation as illustrated in FIG. 4.

At step S306, the modem layer 130 sets all the IMS related Capabilities including the Voice Domain Preference and the SRVVC Capability similar to the IMS unsupported terminal. Specifically, the Voice Domain Preference is set to "CS Voice only", and the SRVCC Capability is set OFF.

At step S307, the radio signal control unit 133 establishes radio communication with the RAN 200 in the VPLMN cased on the Capability such as the updated SRVCC Capability.

At step S308, the location registration control unit 132 starts an Attach or a location registration for the CN 200 in the VPLMN based on the Capability such as the updated Voice Domain Preference and connects to an APN other than IMSs such as the Internet APN.

At step S309, the RAN 200 in the VPLMN and the 210 receiving the indication will handle the user equipment 100 in the exactly same manner as the IMS unsupported terminal. As a result, it is possible to prevent unexpected operations such as execution of procedures to be performed for the IMS supported terminal.

FIG. 8 is a sequence diagram illustrating an IMS ON setup operation according to another embodiment of the present invention. In this embodiment, user equipment, which has been camped in an unsupported VPLMN and has been set to the IMS OFF, is now camped in an IMS supported HPLMN and sets the IMS ON. As illustrated in FIG. 8, at step S401, the user equipment 100 is camped in the HPLMN.

At step S402, the modem layer 130 indicates to the APL layer 110 that the user equipment 100 has been camped in the HPLMN. Since this indication includes a PLMN identifier of the HPLMN, the APL layer 110 can recognize that the user equipment 100 has been camped in the VPLMN based on the PLMN identifier.

At step S403, the APL layer 110 sets the IMS ON setup based on a Configuration having the IMS ON during camping in the HPLMN in advance and indicates to the SIP layer 120 and the modem layer 130 that the IMS ON has been set.

At step S404, the SIP layer 120 deactivates transmission prevention of SIP signals to the IMS NW 220.

At step S405, the modem layer 130 restores the IMS related Capability including the Voice Domain Preference and the SRVCC Capability into the setup value existing before the IMS OFF setup operation. For example, Voice Domain Preference is restored into any setup value of "IMS PS Voice preferred, CS Voice as secondary", "CS Voice preferred IMS PS Voice as secondary" and "IMS PS Voice only", and the SRVCC Capability is set ON. To this end, when the Capability is changed in the IMS OFF setup operation, the pre-changing Capability is stored in a memory device or the like.

At step S406, the radio signal control unit 133 establishes radio communication with the RAN 200 in the HPLMN based on the Capability such as the updated SRVCC Capability.

At step S407, the location registration control unit 132 starts an Attach or a location registration for the CN 200 in the HPLMN based on the Capability such as the updated Voice Domain Preference and connects to an IMS APN.

At step S408, the modem layer 130 transmits an IMS PDN establishment indication to the SIP layer 120.

At step S409, the SIP layer 120 starts a SIP_Registration procedure to request a SIP Registration. Specifically, the SIP layer 120 transmits an IMS Registration to the IMS NW 220 in the HPLMN. Upon receiving the IMS Registration, the IMS NW 220 enables registration of the user equipment 100 with IMS services.

At step S410, the RAN 200 in the HPLMN and the 210 receiving the indication will handle the user equipment 100 as an IMS supported terminal in the same manner as before the IMS OFF setup.

The individual embodiments of the IMS setup operations described with reference to FIGS. 4-8 may be used in combination. For example, an embodiment of combination the IMS OFF setup operations as illustrated in FIGS. 4 and 7 can be also implemented, and in response to occurrence of any event of user's IMS OFF setup manipulation as illustrated in FIG. 4 as well as the user equipment 100 being camped in the IMS unsupported network, the above-stated operations may be performed by the SIP layer 120 and the modem layer 130, and the user equipment 100 may be caused to operate as the IMS unsupported terminal. Similarly, an embodiment of combination of the IMS ON setup operations as illustrated in FIGS. 6 and 8 can be implemented, and in response to occurrence of any event of user's IMS ON setup manipulation as illustrated in FIG. 6 as well as the user equipment 100 being camped in the IMS supported network, the above-stated operations may be performed by the SIP layer 120 and the modem layer 130, and the user equipment 100 may be caused to operate as the IMS supported terminal.

Although the embodiments of the present invention have been described in detail, the present invention is not limited to the specific embodiments, various modifications and variations can be made within the spirit of the present invention as recited in claims.

This international patent application is based on Japanese Priority Application No. 2013-219465 filed on Oct. 22, 2013, the entire contents of which are hereby incorporated by reference.

LIST OF REFERENCE SYMBOLS

100: user equipment
110: application (APL) layer
120: SIP layer
130: modem layer
140: hardware

The invention claimed is:

1. User equipment supporting an IMS function, comprising:
   an application layer configured to provide a user interface for a user to set ON or OFF the IMS function;
   a SIP layer configured to enable or disable transmission of a SIP signal to a resident network corresponding to user's setting ON or OFF the IMS function in the user interface; and
   a modem layer configured to change an IMS related Capability of the user equipment related to the IMS function corresponding to user's setting ON or OFF the IMS function in the user interface and communicate with the resident network based on the changed Capability, wherein
   the application layer uses historical information regarding a history of previous IMS usage in the user equipment to determine a timing of providing the user interface.

2. The user equipment as claimed in claim 1, wherein in response to user's setting OFF the IMS function in the user interface, the SIP layer disables transmission of a SIP signal to the resident network, and the modem layer changes the IMS related Capability of the user equipment to correspond to the IMS related Capability configured for user equipment that does not support the IMS function.

3. The user equipment as claimed in claim 2, wherein in response to user's setting ON the IMS function in the user interface, the SIP layer enables transmission of a SIP signal to the resident network, and the modem layer restores the IMS related Capability of the user equipment changed in response to setting OFF the IMS function into a pre-changed IMS related Capability.

4. A method for setting an IMS function in user equipment, the method comprising:
   providing a user interface for a user to set ON or OFF the IMS function;
   receiving user's setting ON or OFF the IMS function in the user interface;
   enabling or disabling transmission of a SIP signal to a resident network corresponding to the received setting ON or OFF the IMS function;
   changing an IMS related Capability of the user equipment related to the IMS function corresponding to the received setting ON or OFF the IMS function; and
   communicating with the resident network based on the changed Capability, wherein
   the method further comprises using historical information regarding a history of previous IMS usage in the user equipment to determine a timing of providing the user interface.

5. User equipment supporting an IMS function, the user equipment comprising:
   processing circuitry configured to
      provide a user interface for a user to set ON or OFF the IMS function;
      receive a user's setting ON or OFF the IMS function at the user interface;
      enable or disable transmission of a SIP signal to a resident network corresponding to the received setting ON or OFF the IMS function;
      change an IMS related Capability of the user equipment related to the IMS function corresponding to the received setting ON or OFF the IMS function; and
      communicate with the resident network based on the changed Capability, wherein
   the processing circuitry is configured to use historical information regarding a history of previous IMS usage in the user equipment to determine a timing of providing the user interface.

6. The user equipment as claimed in claim 5, wherein in response to user's setting OFF the IMS function in the user interface, the processing circuitry is configured to disable transmission of a SIP signal to the resident network, and change the IMS related Capability of the user equipment to correspond to the IMS related Capability configured for user equipment that does not support the IMS function.

7. The user equipment as claimed in claim 5, wherein in response to user's setting ON the IMS function in the user interface, the processing circuitry is configured to enable transmission of a SIP signal to the resident network, and restore the IMS related Capability of the user equipment changed in response to setting OFF the IMS function into a pre-changed IMS related Capability.

* * * * *